United States Patent [19]
Tamil et al.

[11] Patent Number: 5,414,789
[45] Date of Patent: May 9, 1995

[54] OPTICAL LOGIC GATES WITH HIGH EXTINCTION RATIO USING INVERSE SCATTERING TECHNIQUE AND METHOD USING SAME

[75] Inventors: Lakshman S. Tamil, Dallas, Tex.;
Arthur K. Jordan, Alexandria, Va.

[73] Assignees: United States of America, Washington, D.C.; Board of Regents, University of Texas, Austin, Tex.

[21] Appl. No.: 923,113

[22] Filed: Jul. 30, 1992

[51] Int. Cl.⁶ .................. G02B 6/12; G02B 6/26; G06E 1/04
[52] U.S. Cl. .................. 385/122; 385/16; 385/28; 385/40; 385/45; 385/14; 385/130; 385/131; 385/132; 364/712; 364/713; 359/107; 359/108
[58] Field of Search .......... 385/1, 4, 5, 9, 14, 385/15, 16, 27, 28, 30, 31, 40, 41, 45, 42, 122, 129, 130, 131, 132; 364/700, 712, 713, 822; 359/107, 108

[56] References Cited

U.S. PATENT DOCUMENTS

| | | | |
|---|---|---|---|
| 3,849,740 | 11/1974 | Brandt | 372/108 X |
| 4,626,878 | 12/1986 | Kuwano et al. | 357/19 |
| 4,771,169 | 9/1988 | Boatmun | 250/213 A |
| 4,810,050 | 3/1989 | Hooper | 385/14 X |
| 4,815,027 | 3/1989 | Tokumitsu et al. | 385/5 X |
| 4,930,873 | 6/1990 | Hunter | 350/354 |
| 4,932,739 | 6/1990 | Islam | 385/122 X |
| 4,947,170 | 8/1990 | Falk | 385/122 X |
| 4,961,618 | 10/1990 | Jordan et al. | 385/122 X |
| 4,962,987 | 10/1990 | Doran | 385/122 X |
| 4,978,842 | 12/1990 | Hinton et al. | 250/213 X |
| 5,005,933 | 4/1991 | Shimuzu | 385/122 |
| 5,013,113 | 5/1991 | Soref | 385/14 X |
| 5,013,114 | 5/1991 | Young | 385/14 X |
| 5,024,499 | 6/1991 | Falk | 385/122 X |
| 5,078,464 | 1/1992 | Islam | 385/122 |
| 5,115,488 | 5/1992 | Islam et al. | 385/129 |
| 5,119,228 | 6/1992 | Fang | 359/245 |
| 5,182,666 | 1/1993 | Kawabe | 359/107 |
| 5,295,010 | 3/1994 | Barnes et al. | 359/107 |

OTHER PUBLICATIONS

Tamil, Lakshman S., et al., "An Inverse-Scattering Model for an All-Optical Logic Gate," J. Appl. Phys., 70(3):1882–1884, Aug. 1, 1991.

*Primary Examiner*—Brian Healy
*Attorney, Agent, or Firm*—Arnold, White & Durkee

[57] ABSTRACT

Optical logic gates are designed using inverse-scattering theory, resulting in devices which are intrinsic and passive, having high extinction ratios and large fan out. The Boolean operation is modeled by a pair of reflection coefficients, corresponding to the '1' and '0' states of the device. When inverse scattering theory is applied, each reflection coefficient yields a unique refractive index profile. The multivalued nature of the refractive index profile is achieved by introducing nonlinearity in the core region of a thin-film waveguide, which acts as the basic structure of the devices.

50 Claims, 5 Drawing Sheets

OPTICAL LOGIC GATES WITH HIGH EXTINCTION RATIO USING INVERSE SCATTERING TECHNIQUE AND METHOD USING SAME

BACKGROUND OF THE INVENTION

This work was supported in part by the Core Research Program of the Naval Research Laboratory (N000173-89-MH691). The government has certain rights in the invention.

Field of the Invention

The invention relates to optical logic devices.

Background

Design of optical logic devices has in the past been based on the analysis of passive or active etalons. The present invention, however, incorporates design elements specified using inverse scattering theory. This theory was recently applied to design of a wide-core single-mode planar waveguide (U.S. Pat. No. 4,961,618, Jordan et al., incorporated herein by reference), but has not been applied to design of optical logic devices. Note that inverse scattering theory is to be distinguished from the direct-scattering methods which have been applied to logic gate design in the past.

The basic concept underlying inverse scattering theory is reconstruction of the physical parameters of objects from information contained in their scattering data. The design of optical waveguides as in Jordan et al. applies inverse scattering theory to determine waveguide design parameters for a transmission characteristic prescribed by system requirements. Having determined an acceptable inhomogeneous permittivity profile for enabling propagation of a single-mode light wave longitudinally in the waveguide, the parameters of physical structures and materials which exhibit these characteristics can then be specified by methods well-known in the art.

The same procedure, however, cannot be followed in the application of inverse scattering theory to the design of optical logic gates. This is because prior art waveguides as in Jordan et al. have no Boolean logic functions. They are designed exclusively for light propagation, not for the condition where the waveguide fails to support a guided mode. The latter condition, however, is required for the logical '0' output in optical logic gates of the present invention.

The extensions and modifications of inverse scattering theory necessary to design all-optical logic gates according to the present invention are described herein. Logic gates can be initially modeled by considering the physical requirements for transmission or propagation (ON state or logical '1'), as well as those for reflection or scattering (OFF state or logical '0') of optical input signals. However, the next step normally employed for waveguide design is unsatisfactory for optical logic gates. This is because the refractive index profile for a waveguide is single-valued, while analogous profiles for logic gates must be multivalued to support the necessary switching functions.

SUMMARY OF THE INVENTION

The present invention comprises methods and apparatii unavailable in the prior art; it demonstrates the need for multivalued refractive index profiles, and discloses methods to achieve the profiles in physically realizable all-optical logic devices with high extinction ratios and large fan out. High extinction ratios mean that the ratio of logic '1' to logic '0' output levels is relatively large, allowing such signals to be further processed by logic devices without loss of data. Large fan out means that the logic output of devices of the present invention may be connected simultaneously to a relatively large number of logic devices without significant signal degradation and loss of data. Devices of the present invention can also, of course, be connected in cascade (connections made from the output of one logic device to an input of another logic device) to implement logical functions other than logical AND.

Multivalued refractive index profiles are achieved in practice by passing summed optical logic inputs through a specified spatial intensity filter and then to a dielectric waveguide that can have two a priori unknown different inhomogeneous permittivity profiles. The effective profile at any given time depends upon the energy of the incident summed optical logic input signal at that time. The two permittivity profiles are chosen from among those reconstructed using inverse scattering theory from specifications for the modal structures of the two states of the logic gate output ('1' and '0').

The two logical output states are modeled by analytic representations of two phase-conjugate nonzero transverse reflection coefficients, i.e., two reflection coefficients with equal amplitudes but with a phase difference of $\pi$ radians. Inverse scattering theory is applied to these phase-conjugate reflection coefficients to reconstruct the permittivity profiles corresponding to the two required logical output states.

Figure 1A:
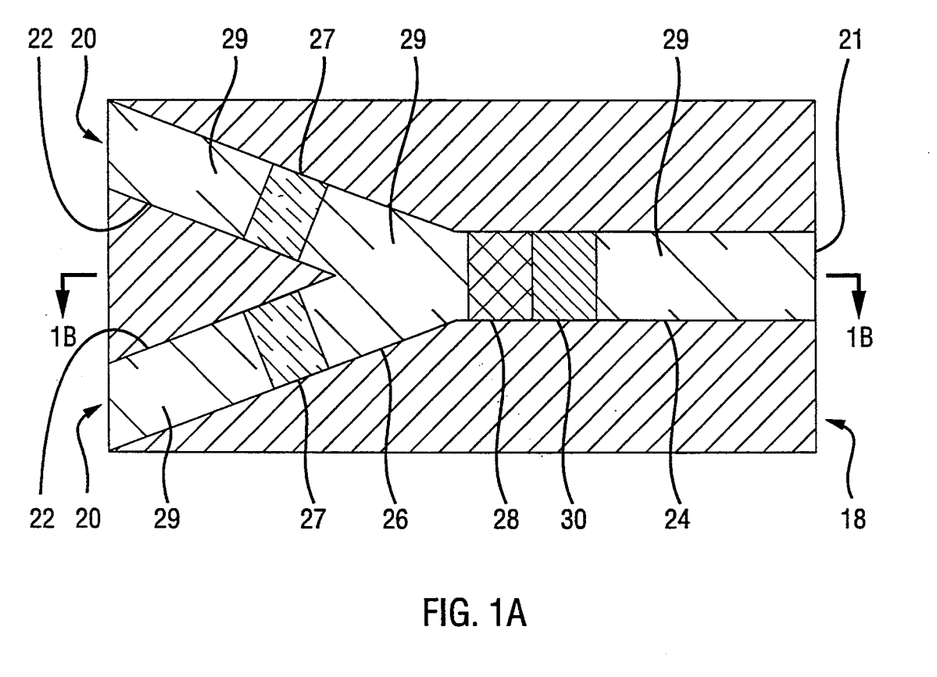
FIGS. 1A and 1B illustrate two schematic views of an optical AND gate in accordance with the present invention.
Figure 1B:
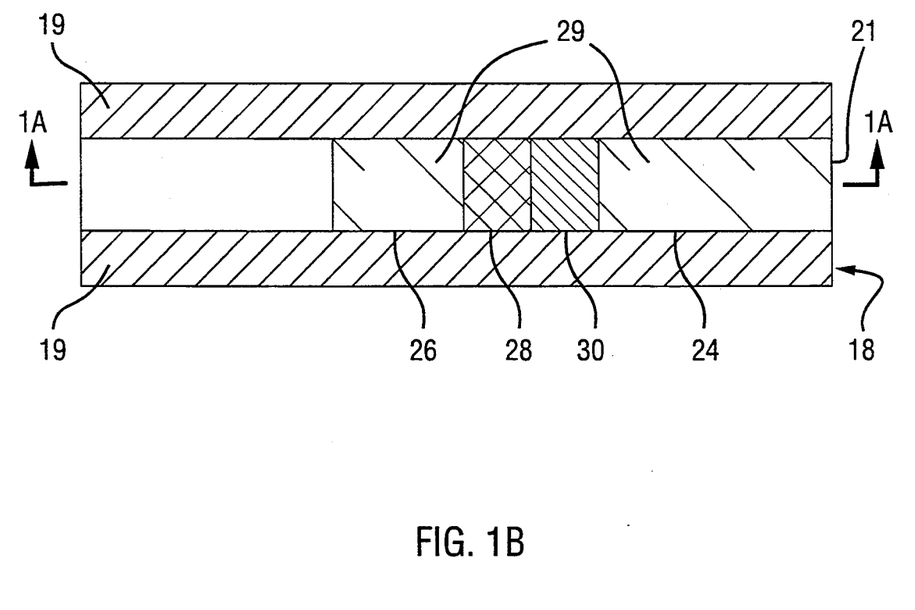

To illustrate, consider the idealized model of a one-dimensional inhomogeneous optical waveguide and its extension to two-dimensional devices as shown in FIGS. 1A and 1B. The inhomogeneous core region has a priori unknown permittivity profiles $\epsilon(x)$ whose forms depend nonlinearly on the incident summed input wave amplitude. Appropriate gradient-index optical waveguides can be designed by specifying the transverse wavenumber dependence of the reflection coefficient $r(k)$, since it describes which modes are guided, i.e., transmittted within the waveguide, or not guided, i.e., radiated or evanescent outside the waveguide. It is useful to represent the device characteristics through $r(k)$ by rational functions of the complex transverse wave number $k$; a three-pole $r(k)$ has been used previously. These results are applied to the waveguide described above, where the two energy-dependent permittivity profiles aid in realizing the signal-processing functions of an optical logic gate.

Transverse reflection coefficients modeling the ON and OFF output states of an optical logic gate are specified so that the ON state supports a guided mode (corresponding to conventional waveguide design) and the OFF state does not. The nonlinear thin film acting as the core of the planar optical waveguide portion of the optical logic gate then changes its permittivity profile, supporting a guided mode when the gate output is logical '1' and a non-guided mode when the gate output is logical '0'. Proper variation of the refractive index profiles for a given set of optical inputs is then obtained by spatial intensity filtering of the summed optical input.

DETAILED DESCRIPTION OF THE INVENTION

A. Definitions $\beta$ longitudinal wavenumber $\Delta_{ON}$, $\Delta_{OFF}$ the normalized refractive index profiles corresponding to the '1' (ON) and '0' (OFF) states of the logic device $\overline{E}$ electric field vector $\epsilon(x,y)$ a priori unknown permittivity profiles of an inhomogeneous core region F the spatial intensity filter of an optical AND gate $I_1$, $I_2$ the input arms of an optical AND gate $I(x)$ the intensity of the spatial intensity filter as a function of the spatial coordinate k complex transverse wave number N the nonlinear core region of an optical AND gate $n_2$ the second order nonlinear refractive index of the optical material used to fabricate the core of the waveguide O the output arm of an optical AND gate $\phi(k,x)$ steady-state wave amplitude $r(k)$ transverse reflection coefficient

B. Detailed Description

An embodiment of an optical logic gate of the present invention is shown in FIGS. 1A and 1B, the logic gate (18) being made up of thin film core media (e.g., 29) sandwiched between cladding media (19). The core media and cladding comprise a waveguide, but because of permittivity profiles which vary with the core media in different portions of the logic gate, the waveguide has different transmission characteristics in those regions.

For example, spatial intensity filters are realized by changing the permittivity profile of the medium in the waveguide. In some embodiments of the logic gate, a spatial intensity filter (27) is inserted in each of several possible input arms (22) so that incoming optical logic signals (20) are filtered before they reach the summing junction (26) of the logic gate. In such embodiments having filters before the summing junction, there will be no spatial intensity filter (28) after the summing junction (26). On the other hand, embodiments having no spatial intensity filters in the input arms (27) would have filter (28) after the summing junction (26).

Figure 2:
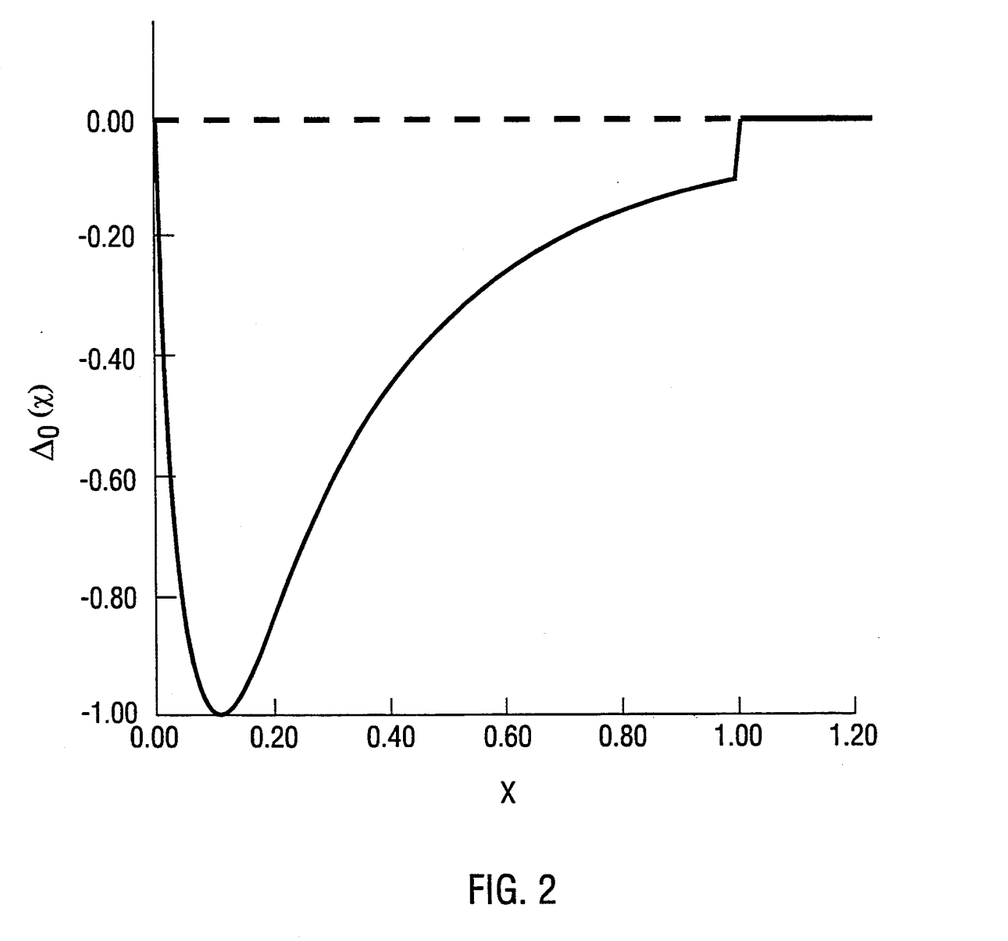
FIG. 2 is the permittivity profile of the AND gate of FIGS. 1A and 1B with inputs in the states (0,0), (0,1) and (1,0).

Whatever the position of the spatial intensity filter (before the summing junction or after it), a portion of the output arm (24) is composed of a nonlinear medium with a permittivity profile shown in FIG. 2 for low light intensities; this profile is specified so it will not support a guided mode in the waveguide. In FIGS. 1A and 1B, the portion of the output arm medium exhibiting this nonlinear characteristic is labeled (30).

When the optical logic inputs are (0,0), (0,1) or (1,0), the summed input intensity is not sufficient to change the refractive index associated with the profile of FIG. 2. Thus, a high proportion of input light will be scattered without being propagated in the waveguide. Scattering occurs because the low refractive index of the core compared to the cladding results in loss of the input light energy as leaky waves. This corresponds to the logical '0' output state of the device.

Figure 3:
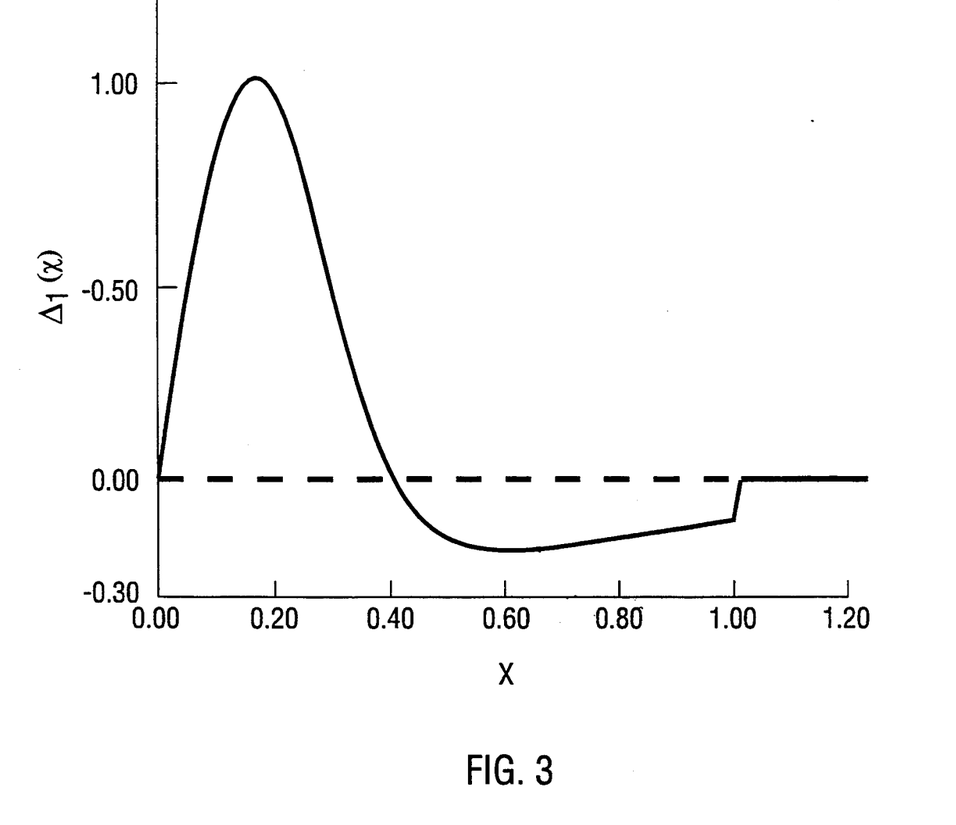
FIG. 3 is the permittivity profile of the AND gate of FIGS. 1A and 1B with inputs in the (1,1) state.

When the logical input state is (1,1), however, the summed input intensity is sufficient to change the permittivity profile of the nonlinear medium (30) from that shown in FIG. 2 to that shown in FIG. 3. In that condition, the thin-film core guides a propagating mode that can be detected at the output (21); this corresponds to the logical '1' output state of the device.

Combining the two refractive index profiles (FIGS. 2 and 3) in a nonlinear core medium and adding appropriate spatial filtering of the input light (before or after the summing junction) therefore results in a logic device which behaves as an AND gate. Further, such an AND gate has a high extinction ratio (the ratio of output intensity when the output is logical '1' to the output intensity when the output is logical '0.' A high extinction ratio, coupled with a large fan out allow logic devices of the present invention to be connected in cascade as illustrated schematically in FIG. 4.

The refractive index profiles shown in FIGS. 2 and 3 are important to the design of the optical logic device. They are designed using the inverse scattering method, a technique which has not heretofore been applied to design of optical logic devices. The specified reflection coefficients are ratios of two polynomial functions of the transverse wave number which are used as input data to the inverse scattering algorithm which calculates the sets of refractive index profiles.

A waveguide with core material having the above permittivity profiles, however, is not sufficient to provide logic gate function. A spatial intensity filter must be added for the summed optical inputs, the filter having characteristics given by $$I(x) = (\Delta_{ON} - \Delta_{OFF})/n_2$$

where I(x) is the intensity as a function of the spatial coordinate, $\Delta_{ON}$ and $\Delta_{OFF}$ are the normalized refractive index profiles corresponding to the '1' (ON) and '0' (OFF) states of the device (shown in FIGS. 4 and 3 respectively), and $n_2$ is the second order nonlinear refractive index of the optical material used to fabricate the core of the waveguide.

The resulting optical logic device can be modeled using a class of many different reflection coefficients, each providing a different refractive index profile for the logic device as a whole. But an optimum profile with the least intensity requirement to switch from the '0' state to the '1' state can be selected from the various available profiles. The structure shown in FIGS. 1A and 1B can then be re-configured to function as an OR, NAND, NOR and NOT gate as desired. Further, such devices may be connected in cascade, with the output of each of one or more logic devices connected to an input of another logic device; a simple example is shown in FIG. 4, wherein optical AND gates (90, 91 and 100) are each substantially similar to the optical AND gate illustrated in FIGS. 1A and 1B.

Figure 4:
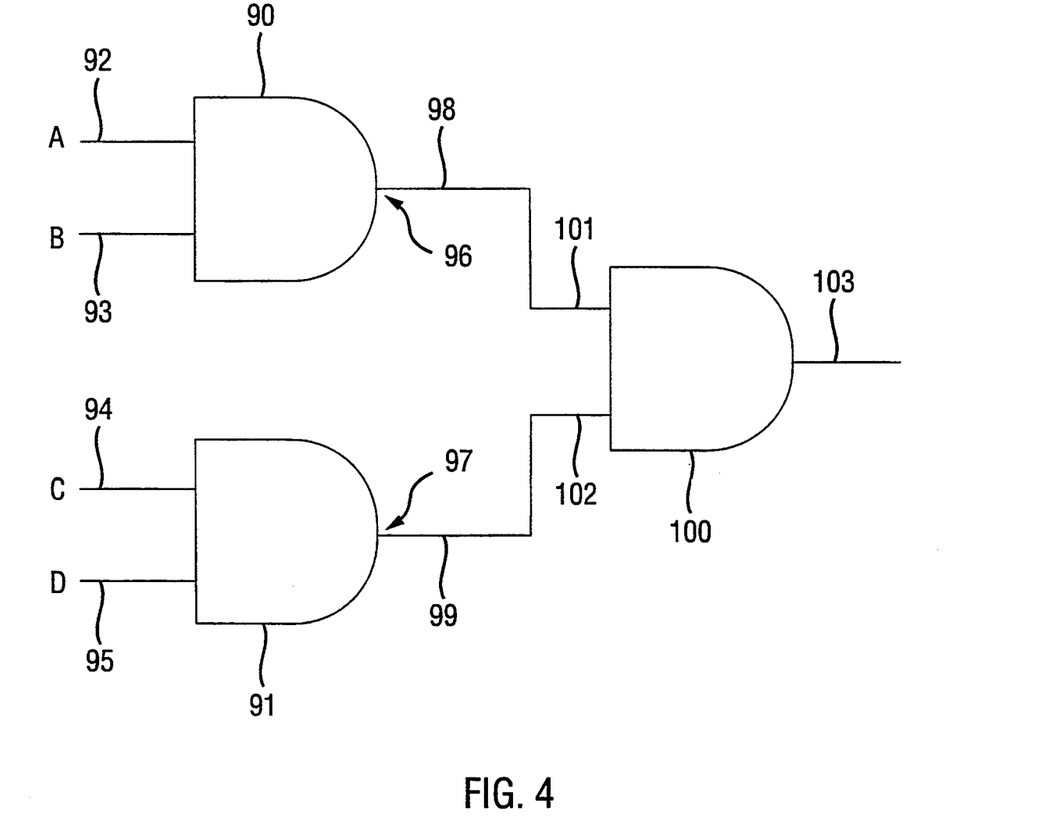
FIG. 4 illustrates optical AND gates connected in cascade.

FIG. 4 shows two optical AND gates (90 and 91) having two logic inputs each (92 and 93 for gate 90; 94 and 95 for gate 91). Outputs of gates (90 and 91) are designated (96 and 97) respectively. Output (96) carries the logic function 'A AND B,' while output (97) carries the logic function 'C AND D.' Outputs (96 and 97) are connected in cascade via connectors (98 and 99) to the inputs (101 and 102) of a third optical AND gate (100), and the output (103) of gate (100) carries the logic function 'A AND B AND C AND D.' Thus, a new logic function is realized from two-input optical AND gates of the present invention. Other (analogous) combinations of logic elements of the present invention to form different logic elements are included in the present invention.

Selected Embodiments

A first embodiment of the current invention is an optical logic device for performing Boolean logic operations on optical inputs, said device comprising a plurality of optical logic inputs; an optical summer for optically summing intensities of said logic inputs to form a summed input intensity signal; a spatial intensity optical filter for filtering said summed input intensity signal to form a filtered summed input intensity signal; and an optical waveguide connected to receive said filtered summed input intensity signal, and having a first inhomogeneous permittivity profile which changes to a second inhomogeneous permittivity profile when said filtered summed input intensity signal is above an intensity threshhold.

In a second embodiment, spatial intensity filtering takes place before optical summing, yielding an optical logic device for performing Boolean logic operations on optical inputs, said device comprising a plurality of optical logic inputs; a spatial intensity optical filter for filtering said logic inputs to form filtered inputs; an optical summer for optically summing intensities of filtered inputs to form a summed filtered input intensity signal; and an optical waveguide connected to receive said summed filtered input intensity signal, and having a first inhomogeneous permittivity profile which changes to a second inhomogeneous permittivity profile when said summed filtered input intensity signal is above an intensity threshhold.

A third embodiment of the invention comprises an optical logic device as in the first embodiment, wherein the intensity threshhold is above the filtered summed input intensity signal when one optical logic input is logical '0,' and wherein the threshhold is below the filtered summed input intensity signal when all optical logic inputs are logical '1.'

A fourth embodiment of the invention comprises an optical logic device as in the second embodiment, wherein the intensity threshhold is above the summed filtered input intensity signal when one optical logic input is logical '0,' and wherein the threshhold is below the summed filtered input intensity signal when all optical logic inputs are logical '1.'

Fifth and sixth embodiments of the invention comprise optical logic devices of the first or second embodiments wherein the waveguide with the first inhomogeneous permittivity profile has no guided modes.

Seventh and eighth embodiments of the invention comprise optical logic devices of the first or second embodiments wherein the waveguide with the second inhomogeneous permittivity profile has one guided mode.

Ninth and tenth embodiments of the invention comprise optical logic devices of the first or second embodiments wherein the optical waveguide is a thin-film waveguide.

Eleventh and twelfth embodiments of the invention comprise optical logic devices of the first or second embodiments wherein the optical waveguide is a channel thin-film waveguide.

Thirteenth and fourteenth embodiments of the invention comprise optical logic devices of the first or second embodiments wherein said optical logic inputs comprise coherent light when said inputs are logical '1.'

Fifteenth and sixteenth embodiments of the invention comprise optical logic devices of the first or second embodiments wherein said first and second inhomogeneous permittivity profiles are specified by FIG. 2 and FIG. 3 respectively.

Seventeenth and eighteenth embodiments of the invention comprise optical logic devices of the first or second embodiments wherein there are two optical inputs.

Nineteenth and twentieth embodiments of the invention comprise optical logic devices of the first or second embodiments wherein the optical waveguide comprises a core medium sandwiched between two cladding media.

Twenty-first and twenty-second embodiments of the invention comprise optical logic devices of the nineteenth or twentieth embodiments wherein characteristics of the spatial intensity optical filter are given by the function $$I(x) = (\Delta_{ON} - \Delta_{OFF})/n_2$$

where $I(x)$ is intensity as a spatial coordinate function, $\Delta_{ON}$ and $\Delta_{OFF}$ are normalized permittivity profiles corresponding to the '1' (ON) and '0' (OFF) states of the device, and $n_2$ is a second order nonlinear refractive index of the core medium of the waveguide.

A twenty-third embodiment of the invention comprises a method for performing Boolean logic operations on optical logic inputs, said method comprising optically summing intensities of a plurality of logic inputs to form a summed input intensity signal; filtering said summed input intensity signal to form a filtered summed input intensity signal; applying said filtered summed input intensity signal to a waveguide having a first inhomogeneous permittivity profile which changes to a second inhomogeneous permittivity profile when said filtered summed input intensity signal is above a threshhold; and observing guided modes of said filtered summed input intensity signal within said waveguide.

A twenty-fourth embodiment of the invention comprises a method for performing Boolean logic operations on optical logic inputs, said method comprising filtering a plurality of logic inputs to form filtered inputs; optically summing intensities of said filtered inputs to form a summed filtered input intensity signal; applying said summed filtered input intensity signal to a waveguide having a first inhomogeneous permittivity profile which changes to a second inhomogeneous permittivity profile when said summed filtered input intensity signal is above a threshhold; and observing guided modes of said summed filtered input intensity signal within said waveguide.

A twenty-fifth embodiment of the invention comprises the method of the twenty-third embodiment wherein the threshhold is above the filtered summed input intensity signal when one optical logic input is logical '0,' and wherein the threshhold is below the filtered summed input intensity signal when all optical logic inputs are logical '1.'

A twenty-sixth embodiment of the invention comprises the method of the twenty-fourth embodiment wherein the threshhold is above the summed filtered input intensity signal when one optical logic input is logical '0,' and wherein the threshhold is below the summed filtered input intensity signal when all optical logic inputs are logical '1.'

Twenty-seventh and twenty-eighth embodiments of the invention comprise methods of the twenty-third or twenty-fourth embodiments wherein the waveguide with the first inhomogeneous permittivity profile has no guided modes.

Twenty-ninth and thirtieth embodiments of the invention comprise methods of the twenty-third or twenty-fourth embodiments wherein the waveguide with the second inhomogeneous permittivity profile has one guided mode.

Thirty-first and thirty-second embodiments of the invention comprise methods of the twenty-third or twenty-fourth embodiments wherein said optical logic inputs comprise coherent light when said inputs are logical '1.'

Thirty-third and thirty-fourth embodiments of the invention comprise methods of the twenty-third or twenty-fourth embodiments wherein said optical logic inputs comprise partially coherent light when said inputs are logical '1.'

Thirty-fifth and thirty-sixth embodiments of the invention comprise methods of the twenty-third or twenty-fourth embodiments wherein said optical logic inputs comprise incoherent light when said inputs are logical '1.'

Thirty-seventh and thirty-eighth embodiments of the invention comprise methods of the twenty-third or twenty-fourth embodiments wherein said first and second inhomogeneous permittivity profiles are specified by inverse-scattering analysis.

A thirty-ninth embodiment of the invention comprises a passive optical AND gate, the gate comprising a thin-film waveguide; a plurality of optical logic inputs; and an optical logic output; wherein the optical logic output is logical '0' unless all optical logic inputs are logical '1,' and wherein the optical logic output is logical '1' if all optical logic inputs are logical '1.'

A fortieth embodiment of the invention comprises a passive optical AND gate of the thirty-ninth embodiment wherein there are two optical logic inputs.

Forty-first and forty-second embodiments of the invention comprise the optical logic device of the first or second embodiments wherein the logic device is passive.

A forty-third embodiment of the invention comprises an optical logic device, the device comprising a waveguide having a core medium sandwiched between two cladding media, said core medium comprising a nonlinear material with more than one inhomogeneous permittivity profile.

A forty-fourth embodiment of the invention comprises the optical logic device of the forty-third embodiment wherein the core medium has a first and a second inhomogeneous permittivity profile.

A forty-fifth embodiment of the invention comprises the optical logic device of the forty-fourth embodiment wherein the waveguide having the first inhomogeneous permittivity profile has no guided modes.

A forty-sixth embodiment of the invention comprises the optical logic device of the forty-fourth embodiment wherein the waveguide having the second inhomogeneous permittivity profile has one guided mode.

A forty-seventh embodiment of the invention comprises the optical logic device of the forty-fourth embodiment wherein the waveguide is a thin-film waveguide.

A forty-eighth embodiment of the invention comprises the optical logic device of the forty-fourth embodiment wherein the waveguide is a thin-film channel waveguide.

Forty-ninth and fiftieth embodiments of the invention comprise the optical logic device of the first or second embodiments wherein the device has an extinction ratio more than 25.

Fifty-first and fifty-second embodiments of the invention comprise the optical logic device of the thirty-ninth or forty-fourth embodiments wherein the device has an extinction ratio more than 25.

A fifty-third embodiment of the invention comprises a plurality of the passive optical AND gates of the thirty-ninth embodiment connected in cascade.

C. Examples

The following examples are presented to describe preferred embodiments and utilities of the present invention, and are not meant to limit the invention unless otherwise stated in the claims appended hereto. Taken together, the examples illustrate representative demonstrations of the best mode of implementing the invention as currently understood.

EXAMPLE 1

Specifying Permittivity Profiles Using Inverse Scattering Theory

The propagation of the electric field $\overline{E}$ in an inhomogeneous planar waveguide is governed by the vector wave equation $$\nabla^2 \overline{E} + \nabla \left( \overline{E} \cdot \frac{1}{\epsilon_r} \nabla \epsilon_r \right) + \frac{\epsilon_r}{c^2} \frac{\partial^2}{\partial t^2} \overline{E} = 0, \quad (1)$$

where, $k_c = \omega\sqrt{\mu_o \epsilon_c}$ is the wave number in the external cladding region with a permittivity $\epsilon_c$ and $\epsilon_r = \epsilon_r(x) = \epsilon(x)/\epsilon_o$ is the relative permittivity of the inhomogeneous core region that supports the guided mode. Considering time-harmonic transverse-electric (TE) waves propagating in the positive z-direction so the electric field vector $\overline{E}$ has the form $$\overline{E} = y\phi(k,x)e^{i\beta z - i\omega t} \quad (2)$$

where $\beta$ is the longitudinal wavenumber, Eq. (1) becomes $$\frac{d^2}{dx^2} \phi(k,x) + [k^2 - q(x)]\phi(k,x) = 0. \quad (3)$$

The linear differential equation (3) governs the steady-state wave amplitude $\psi(k,x)$ in the OFF state or the ON state. It does not apply during the nonlinear switching interval. The length of the nonlinear thin-film core N is assumed to be sufficiently small so that the waveform of the guided pulse is not significantly changed while propagating along this length of the core. Under this condition, Eq. (3) describes the modal structure of this device. The scattering potential q(x) is related to the relative permittivity $\epsilon_r(x)$ by $q(x)=k_c^2[1-\epsilon_r(x)]$, so that $q(x)\to 0$ as $|x|\to\infty$, since $\epsilon_r(X)\to 1$ as $|x|\to\infty$. The transverse wave-number k satisfies the dispersion relation $$k^2 = k_c^2 - \beta^2. \tag{4}$$

The general properties of the electromagnetic modes can be classified according to the values of the spectral parameter $k^2$:

$k^2 < O$, the spectrum is discrete and bounded solutions for $\phi$ exist only for a finite number of discrete values $ix_n$ of k. These are termed guided modes and for propagation in the positive z direction, $k_0\sqrt{\epsilon_1} \geq \beta \geq k_c$, where $k_0$ is the free-space wave number.

$k^2 > O$, the spectrum is continuous and is divided into two regions: $O < k < k_c$, $\beta$ is positive and the modes are radiated; $k > k_c$, the modes do not propagate and are term evanescent. For coherent single-mode propagation in the +z direction, the transverse wave-number k can only have a single discrete value in addition to the continuous nonguided modes that contribute to the modal structure of the waveguide for all values of $k^2 > O$. The design of a single-mode waveguide has been demonstrated (1,8) with a three-pole representation for a nonzero r(k), $$r(k) = \frac{r_o}{(k-k_1)(k-k_2)(k-k_3)} \tag{5}$$

where $r_o = k_1 k_2 k_3$ and $k_2 = c_1 - ic_2$ and $k_2 = -k^*_1$ are in the nondiscrete spectrum which represents the leaky and evanescent modes (note that $c_1$ and $c_2$ are real numbers). In order to model an optical gate, we introduce the "pole reflection" $\delta$ so that the third pole $k_3$ is now specified to be $k_3 = i\delta a$, where $a=1$ and the function $$\delta = \begin{cases} +1, \text{ so that } k_3 \text{ is the discrete spectrum} \\ \quad \text{representing the guided mode,} \\ \quad \text{or} \\ -1, \text{ so that } k_3 \text{ is in the unguided spectrum.} \end{cases}$$

The magnitude and the phase of r(k) are $$|r(k)|^2 = \frac{(c_1^2 + c_2^2)^2 a^2 \delta^2}{[(k+c_1)^2 + c_2^2][(k-c_1)^2 + c_2^2][k^2 + \delta^2 a^2]} \tag{6}$$

and $$\phi(k) = -\delta\left[-\pi/2 + \tan^{-1}\left(\frac{a}{k}\right)\right] - \tag{7}$$

$$\left[\tan^{-1}\left(\frac{c_2}{k+c_1}\right) + \tan^{-1}\left(\frac{c_2}{k-c_1}\right)\right];$$

$$\Delta\phi = \pi - 2\tan^{-1}\left(\frac{a}{k}\right). \tag{8}$$

The magnitude of r(k) is the same for the two cases but there is a phase difference.

In the optical limit $k\to\infty$ and $\Delta\phi \to \pi$, so that the reflection coefficients are phase conjugate. For the reflection coefficient r(k), Eq. (5), the scattering potential q(x) can be expressed as $$q(x) = 2[a'^T(x) - a^T(x)A^{-1}(x)A'^{-1}]A^{-1}(x)b, \tag{9}$$

where $^T$ denotes transpose, $'$ denotes $d/dx$, $$a^T(t) = [1t \, \exp(\eta_1 t) \, \exp(-\eta_1 t) \, \exp(\eta_2 t) \, \exp(-\eta_2 t)],$$

$$b^T = [00000 - a\delta(c_1^2 + c_2^2)],$$

and the matrix A is $$\begin{vmatrix} 0 & 1 & 0 & 0 & 0 & 0 \\ 0 & 0 & f(\eta_1) & a\delta(c_1^2+c_2^2) & 0 & 0 \\ 0 & 0 & 0 & 0 & f(\eta_2) & a\delta(c_1+c_2^2) \\ 1 & -x & \exp(-\eta_1 x) & \exp(\eta_1 x) & \exp(-\eta_2 x) & \exp(\eta_2 x) \\ 0 & -1 & -\eta_1\exp(-\eta_1 x) & \eta_1\exp(\eta_1 x) & -\eta_2\exp(-\eta_2 x) & \eta_2\exp(\eta_2 x) \\ 0 & 0 & \eta_1^2\exp(-\eta_1 x) & \eta_1^2\exp(\eta_1 x) & \eta_2^2\exp(-\eta_2 x) & \eta_2^2\exp(\eta_2 x) \end{vmatrix}$$

where f(p) has the functional form $$f(p) = (p+ik_1)(p+ik_2)(p+ik_3),$$

and $$\eta_1 = [(\sigma+p)/2]^{\frac{1}{2}},$$

$$\eta_2 = [(\sigma-p)/2]^{\frac{1}{2}},$$

$$\sigma = a^2 + 2c_2^2 - 2c_1^2,$$

$$p = [(a^2 - 4c_2^2)(a^2 + 4c_1^2)]^{\frac{1}{2}}$$

The normalized permittivity profile, $$\Delta(x) = \frac{\epsilon(x) - \epsilon_c}{\epsilon_1 - \epsilon_c}$$

is shown in FIGS. 2 and 3 for $k_3 = -ia$ and $k_3 = \chi_1 = ia$, respectively, and where $\epsilon_1 = \max[\epsilon(x)]$. The negative portion of the curve in FIG. 3 resembles the "depressed cladding" found in practice.

A schematic diagram for the AND gate incorporating this inhomogeneous optical waveguide is shown in FIG. 1. This is a two-dimensional device whose permittivity surface can be written in the additive form $$\epsilon(x,y) = \epsilon_0 + \epsilon(x) + \epsilon(y), \tag{10}$$

where $\epsilon(x)$ and $\epsilon(y)$ are the permittivity profiles in the x and y directions of the device. Substitution of Eq. (10) in Eq. (1) produces two independent equations of the type shown in Eq. (3), one in the x and the other in the y direction. This inverse-scattering theory can be used for both directions so that the permittivity profiles shown in FIGS. 2 and 3 are applicable for both the x and y directions and can be combined using Eq. (10) to obtain $\epsilon(x,y)$.

The output arm is composed of a nonlinear material with a permittivity profile as shown in FIG. 2. The two input arms combine (sum) the incoming light intensities. When the input is (0,0), (0,1), or (1,0), the combined input intensity is not sufficient to change the refractive index. However, when the input is (1,1), the combined input intensity is sufficient to change the permittivity from that shown in FIG. 2 to FIG. 3, so that this thin-film waveguide guides a propagating mode that can be detected at the output. Thus the device functions as an AND gate. The exact variation of the permittivity shown in FIG. 3 is obtained by proper spatial intensity filtering of the input light radiation.

The existence of a single guided mode in the ON state and the absence of any guided modes in the OFF state can be verified by the criterion for the number of bound states in a potential well. For the case of a single guided mode in an inhomogeneous optical waveguide, this is the integer part of the numerical value of the integral.

$$I = \int_0^{x_0} |x| \, |q_-(x)| dx, \qquad (11)$$

where $q_-(x)$ is the portion of $q(x) < 0$ and $x_0$ is the zero crossing. In this example the pole locations can be conveniently specified ($a=1.0$, $c_1=0.850$, $c_2=0.4999$) so that $I=0$ in the OFF state and $I=1.8223$ in the ON state, respectively, and there is a single-guided mode in the ON state.

Changes may be made in the construction, operation and arrangement of the various parts, elements, steps and procedures described herein without departing from the concept and scope of the invention as defined in the following claims.

What is claimed is:

1. An optical logic device for performing Boolean logic operations on optical inputs, said device comprising
   a plurality of optical logic inputs;
   an optical summer for optically summing intensities of said logic inputs to form a summed input intensity signal;
   a spatial intensity optical filter for filtering said summed input intensity signal to form a filtered summed input intensity signal; and
   an optical waveguide connected to receive said filtered summed input intensity signal, and having a first inhomogeneous permittivity profile which changes to a second inhomogeneous permittivity profile when said filtered summed input intensity signal is above an intensity threshhold.

2. An optical logic device for performing Boolean logic operations on optical inputs, said device comprising
   a plurality of optical logic inputs;
   a spatial intensity optical filter for filtering said logic inputs to form filtered inputs;
   an optical summer for optically summing intensities of filtered inputs to form a summed filtered input intensity signal; and
   an optical waveguide connected to receive said summed filtered input intensity signal, and having a first inhomogeneous permittivity profile which changes to a second inhomogeneous permittivity profile when said summed filtered input intensity signal is above an intensity threshhold.

3. The optical logic device of claim 1, wherein the intensity threshhold is above the filtered summed input intensity signal when one optical logic input is logical '0,' and wherein the threshhold is below the filtered summed input intensity signal when all optical logic inputs are logical '1.'

4. The optical logic device of claim 2, wherein the intensity threshhold is above the summed filtered input intensity signal when one optical logic input is logical '0,' and wherein the threshhold is below the summed filtered input intensity signal when all optical logic inputs are logical '1.'

5. The optical logic device of claim 1 wherein the waveguide with the first inhomogeneous permittivity profile has no guided modes.

6. The optical logic device of claim 1 wherein the waveguide with the second inhomogeneous permittivity profile has one guided mode.

7. The optical logic device of claim 1 wherein the optical waveguide is a thin-film waveguide.

8. The optical logic device of claim 1 wherein the optical waveguide is a channel thin-film waveguide.

9. The optical logic device of claim 1 wherein said optical logic inputs comprise coherent light when said inputs are logical '1.'

10. The optical logic device of claim 1 wherein said first and second inhomogeneous permittivity profiles are specified by FIG. 2 and FIG. 3 respectively.

11. The optical logic device of claim 1 wherein there are two optical inputs.

12. The optical logic device of claim 1 wherein the optical waveguide comprises a core medium sandwiched between two cladding media.

13. The optical logic device of claim 2 wherein the waveguide with the first inhomogeneous permittivity profile has no guided modes.

14. The optical logic device of claim 2 wherein the waveguide with the second inhomogeneous permittivity profile has one guided mode.

15. The optical logic device of claim 2 wherein the optical waveguide is a thin-film waveguide.

16. The optical logic device of claim 2 wherein the optical waveguide is a channel thin-film waveguide.

17. The optical logic device of claim 2 wherein said optical logic inputs comprise coherent light when said inputs are logical '1.'

18. The optical logic device of claim 2 wherein said first and second inhomogeneous permittivity profiles are specified by FIG. 2 and FIG. 3 respectively.

19. The optical logic device of claim 2 wherein there are two optical inputs.

20. The optical logic device of claim 2 wherein the optical waveguide comprises a core medium sandwiched between two cladding media.

21. The optical logic device of claim 12 wherein characteristics of the spatial intensity optical filter are given by the function $$I(x) = (\Delta_{ON} - \Delta_{OFF})/n_2$$

where $Z(x)$ is intensity as a spatial coordinate function, $\Delta_{ON}$ and $\Delta_{OFF}$ are normalized permittivity profiles corresponding to the '1' (ON) and '0' (OFF) states of the device, and $n_2$ is a second order nonlinear refractive index of the core medium of the waveguide.

22. The optical logic device of claim 20 wherein characteristics of the spatial intensity optical filter are given by the function $$I(x) = (\Delta_{ON} - \Delta_{OFF})/n_2$$

where I(x) is intensity as a spatial coordinate function, $\Delta_{ON}$ and $\Delta_{OFF}$ are normalized permittivity profiles corresponding to the '1' (ON) and '0' (OFF) states of the device, and $n_2$ is a second order nonlinear refractive index of the core medium of the waveguide.

23. A method for performing Boolean logic operations on optical logic inputs, said method comprising
optically summing intensities of a plurality of logic inputs to form a summed input intensity signal;
filtering said summed input intensity signal to form a filtered summed input intensity signal;
applying said filtered summed input intensity signal to a waveguide having a first inhomogeneous permittivity profile which changes to a second inhomogeneous permittivity profile when said filtered summed input intensity signal is above a threshhold; and
observing guided modes of said filtered summed input intensity signal within said waveguide.

24. A method for performing Boolean logic operations on optical logic inputs, said method comprising
filtering a plurality of logic inputs to form filtered inputs;
optically summing intensities of said filtered inputs to form a summed filtered input intensity signal;
applying said summed filtered input intensity signal to a waveguide having a first inhomogeneous permittivity profile which changes to a second inhomogeneous permittivity profile when said summed filtered input intensity signal is above a threshhold; and
observing guided modes of said summed filtered input intensity signal within said waveguide.

25. The method of claim 23 wherein the threshhold is above the filtered summed input intensity signal when one optical logic input is logical '0,' and wherein the threshhold is below the filtered summed input intensity signal when all optical logic inputs are logical '1.'

26. The method of claim 24 wherein the threshhold is above the summed filtered input intensity signal when one optical logic input is logical '0,' and wherein the threshhold is below the summed filtered input intensity signal when all optical logic inputs are logical '1.'

27. The method of claim 23 wherein the waveguide with the first inhomogeneous permittivity profile has no guided modes.

28. The method of claim 23 wherein the waveguide with the second inhomogeneous permittivity profile has one guided mode.

29. The method of claim 23 wherein said optical logic inputs comprise coherent light when said inputs are logical '1.'

30. The method of claim 23 wherein said optical logic inputs comprise partially coherent light when said inputs are logical '1.'

31. The method of claim 23 wherein said optical logic inputs comprise incoherent light when said inputs are logical '1.'

32. The method of claim 23 wherein said first and second inhomogeneous permittivity profiles are specified by inverse-scattering analysis.

33. The method of claim 24 wherein the waveguide with the first inhomogeneous permittivity profile has no guided modes.

34. The method of claim 24 wherein the waveguide with the second inhomogeneous permittivity profile has one guided mode.

35. The method of claim 24 wherein said optical logic inputs comprise coherent light when said inputs are logical '1.'

36. The method of claim 24 wherein said optical logic inputs comprise partially coherent light when said inputs are logical '1.'

37. The method of claim 24 wherein said optical logic inputs comprise incoherent light when said inputs are logical '1.'

38. The method of claim 24 wherein said first and second inhomogeneous permittivity profiles are specified by inverse-scattering analysis.

39. The optical logic device of claim 1 wherein the logic device is passive.

40. The optical logic device of claim 2 wherein the logic device is passive.

41. An optical logic device comprising a waveguide having a core medium sandwiched between two cladding media, said core medium comprising an output portion and a plurality of input portions, said output portion comprising a nonlinear material with more than one inhomogeneous permittivity profile.

42. The optical logic device of claim 41, wherein the core medium has a first and a second inhomogeneous permittivity profile.

43. The optical logic device of claim 42, wherein the waveguide having the first inhomogeneous permittivity profile has no guided modes.

44. The optical logic device of claim 42 wherein the waveguide having the second inhomogeneous permittivity profile has one guided mode.

45. The optical logic device of claim 42 wherein the waveguide is a thin-film waveguide.

46. The optical logic device of claim 42 wherein the waveguide is a thin-film channel waveguide.

47. The optical logic device of claim 1 wherein the device has an extinction ratio more than 25.

48. The optical logic device of claim 2 wherein the device has an extinction ratio more than 25.

49. The optical logic device of claim 42 wherein the device has an extinction ratio more than 25.

50. A passive optical AND gate comprising: a thin film waveguide having a plurality of optical logic inputs and an optical logic output; the thin film waveguide having a nonlinear portion coupled to said optical logic inputs and to said optical logic output; the nonlinear portion of the waveguide being characterized by a nonlinear refractive index such that the nonlinear portion of the waveguide enters a propagating mode only when the input light intensity exceeds a threshhold intensity; such that if all of the optical logic inputs are at logic state "1", then the threshhold intensity is exceeded and a logic state "1" is provided at the optical logic output, and if any one of the optical logic inputs is not at logic state "1", then the threshhold intensity is not exceeded and a logic state "0" is provided at the optical logic output.

* * * * *

UNITED STATES PATENT AND TRADEMARK OFFICE
CERTIFICATE OF CORRECTION

PATENT NO. : 5,414,789
DATED : May 9, 1995
INVENTOR(S) : Lakshman Tamil and Arthur K. Jordan It is certified that error appears in the above-indentified patent and that said Letters Patent is hereby corrected as shown below:

In claim 21, column 12, line 64, delete "Z" and insert --I-- therefor.

Signed and Sealed this

Twenty-seventh Day of June, 1995

Attest:

BRUCE LEHMAN

Attesting Officer                    Commissioner of Patents and Trademarks